United States Patent
Parikh et al.

(10) Patent No.: US 9,422,896 B2
(45) Date of Patent: Aug. 23, 2016

(54) METHOD AND SYSTEM FOR CHARGE AIR SYSTEM VALVE DIAGNOSIS

(71) Applicant: General Electric Company, Schenectady, NY (US)

(72) Inventors: Chirag Bipinchandra Parikh, Lawrence Park, PA (US); Shashi Kiran, Lawrence Park, PA (US); Eric David Peters, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 689 days.

(21) Appl. No.: 13/752,446

(22) Filed: Jan. 29, 2013

(65) Prior Publication Data

US 2014/0214302 A1    Jul. 31, 2014

(51) Int. Cl.
| F02D 41/00 | (2006.01) |
| F02D 45/00 | (2006.01) |
| F02B 37/00 | (2006.01) |
| F02B 37/013 | (2006.01) |
| F02B 29/04 | (2006.01) |
| F02B 37/16 | (2006.01) |
| F02B 37/18 | (2006.01) |

(52) U.S. Cl.
CPC .......... *F02M 26/49* (2016.02); *F02D 41/005* (2013.01); *F02D 41/0007* (2013.01); *F02D 45/00* (2013.01); *F02M 26/43* (2016.02); *F02B 29/0412* (2013.01); *F02B 37/004* (2013.01); *F02B 37/013* (2013.01); *F02B 37/16* (2013.01); *F02B 37/18* (2013.01); *Y02T 10/144* (2013.01); *Y02T 10/47* (2013.01)

(58) Field of Classification Search
CPC .......... F02M 25/0702; F02M 25/0704; F02M 25/0706; F02M 25/0707; F02M 25/0711; F02M 25/0753; F02M 25/0756
USPC .............. 123/568.11, 568.16, 568.21, 568.8; 701/108; 73/114.74; 60/605.2
See application file for complete search history.

(56) References Cited

U.S. PATENT DOCUMENTS

| 6,497,227 | B2 * | 12/2002 | Wang et al. ............. 123/568.16 |
| 6,687,601 | B2 * | 2/2004 | Bale et al. ..................... 701/108 |
| 6,837,226 | B2 | 1/2005 | Wang et al. |
| 7,788,923 | B2 * | 9/2010 | Rowells .......................... 60/612 |
| 7,945,376 | B2 * | 5/2011 | Geyer et al. .................... 701/108 |
| 8,316,829 | B2 * | 11/2012 | Piper et al. ............... 123/568.21 |
| 8,683,986 | B2 * | 4/2014 | Elsasser ............. F02D 41/0055 123/568.16 |
| 2010/0294253 | A1 | 11/2010 | Kawase et al. |

* cited by examiner

*Primary Examiner* — Lindsay Low
*Assistant Examiner* — Robert Werner
(74) *Attorney, Agent, or Firm* — GE Global Patent Operation

(57) ABSTRACT

Various methods and systems are provided for diagnosing the position and function of a valve in an engine system. In one embodiment, a method for an engine comprises determining a position of a valve in an engine system based on a turbine speed response upon commanded actuation of the valve.

18 Claims, 6 Drawing Sheets

|  | Valve Positions | | | |
|---|---|---|---|---|
| Condition | First EGR Valve 164 | Second EGR Valve 170 | Turbine Bypass Valve 128 | HP Turbine Speed |
| 1 | Open | Closed | Closed | Base |
| 2 | Open | Opening | Open/Closed | Decreasing |
| 3 | Closing | Open | Open/Closed | Decreasing |
| 4 | Opening | Open | Open/Closed | Increasing |
| 5 | Open | Closing | Open/Closed | Increasing |
| 6 | - | - | Opening | Decreasing |
| 7 | - | - | Closing | Increasing |

FIG. 4

|  | Valve Positions | | |
|---|---|---|---|
| Condition | EGR Valve 163 | Turbine Bypass Valve 128 | HP Turbine Speed |
| 1 | Open | Closed | Base |
| 2 | Closing | Open/Closed | Decreasing |
| 3 | Opening | Open/Closed | Increasing |
| 4 | - | Opening | Decreasing |
| 5 | - | Closing | Increasing |

FIG. 5

METHOD AND SYSTEM FOR CHARGE AIR SYSTEM VALVE DIAGNOSIS

FIELD

Embodiments of the subject matter disclosed herein relate to an engine, engine components, and an engine system, for example.

BACKGROUND

Engines may utilize recirculation of exhaust gas from an engine exhaust system to an engine intake system, a process referred to as exhaust gas recirculation (EGR), to reduce regulated emissions. In some examples, one or more valves may control the flow of exhaust gas in the EGR system. Additionally, engines may utilize one or more turbochargers to increase the power provided by the engine. Turbochargers function by compressing intake air in a compressor via a turbine operated by exhaust gas flow. Turbocharged engines may utilize one or more bypass valves to control the flow through the turbocharger. As such, EGR flow and exhaust flow are controlled by several valves. The position and function of theses valves may be monitored in order to reduce emission violation and maintain engine performance.

In one example, the function of the EGR and turbocharger bypass valves may be diagnosed by valve position feedback sensors. However, such sensors are expensive and may increase the complexity of engine control routines. Additionally, these sensors may not accurately indicate all types of valve degradation; thus, valve diagnosis may be limited.

BRIEF DESCRIPTION

In one embodiment, a method (e.g., a method for controlling an engine system) comprises communicating information relating to a first valve in an engine system based at least in part on a turbine speed response to actuation of the first valve.

In one example, the information comprises a position of the first valve that is determined based at least in part on the turbine speed response to actuation of the first valve. In this way, the function of the first valve in the engine system may be monitored with turbine speed. As such, decreased valve function (valve degradation) may be indicated by a turbine speed response different than expected upon actuation of the valve.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 4 shows a table listing a high pressure turbine speed response for various valve conditions according to an embodiment of the invention.

FIG. 5 shows a table listing a high pressure turbine speed response for various valve conditions according to another embodiment of the invention.

DETAILED DESCRIPTION

The following description relates to various embodiments for diagnosing the position and function of a valve in an engine system. During normal engine operation, a valve in the engine system may be commanded to open, close, or move into an intermediate position. By monitoring a change in turbine speed during the actuation of the valve, the correct movement of the valve may be confirmed. Specifically, the position of one or more valves in the exhaust gas recirculation (EGR) system and a turbine bypass valve may affect the amount of exhaust gas flowing through the turbine. Turbine speed increases with increasing flow of exhaust gas through the turbine. Thus, when one of the above valves changes position, a change in the amount of exhaust gas flowing through the turbine occurs, thereby changing the turbine speed. Valve movements and/or positions may be mapped to expected changes in turbine speed. When a different change in turbine speed than expected results from a commanded actuation of the valve, the valve may not have moved as commanded. As such, by monitoring the turbine speed response upon commanded actuation of a valve, the position of the valve may be determined. In this way, a method utilizing turbine speed may be implemented to monitor proper valve function and diagnose reduced valve function.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a powered rail vehicle (e.g., locomotive) is provided as an example of a mobile platform supporting a system incorporating an embodiment of the invention.

Figure 1:
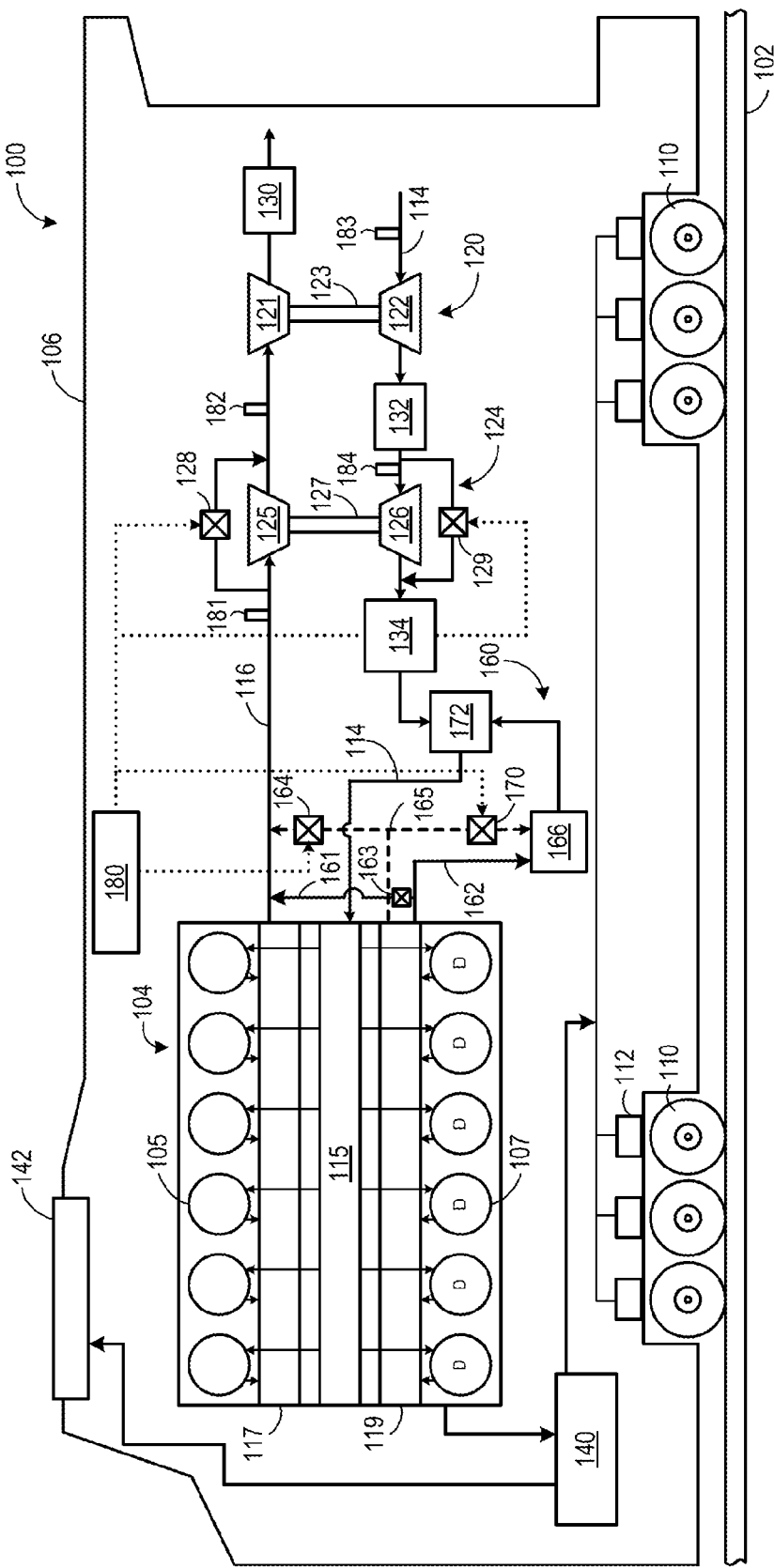
FIG. 1 shows a schematic diagram of a rail vehicle with an engine according to an embodiment of the invention.

Before further discussion of the approach for determining the position of a valve based on turbine speed, an example of a platform is disclosed in which the engine system may be installed in a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 110. As depicted, the rail vehicle 106 includes an engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake, such as an intake manifold 115. The intake may be any suitable conduit or conduits through which gases flow to enter the engine. For example, the intake may include the intake manifold 115, the intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, and the like. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 140 and electric traction motors 112. For example, the engine 104 is a diesel engine that generates a torque output that is transmitted to the alternator/generator 140 which is mechanically coupled to the engine 104. The alternator/generator 140 produces electrical power that may be stored and applied for subsequent propagation to a variety of downstream electrical components. As an example, the alternator/generator 140 may be electrically coupled to a plurality of traction motors 112 and the alternator/generator 140 may provide electrical power to the plurality of traction motors 112. As depicted, the plurality of traction motors 112 are each connected to one of a plurality of wheels 110 to provide tractive power to propel the rail vehicle 106. One example configuration includes one traction motor per wheel. As depicted herein, six pairs of traction motors correspond to each of six pairs of wheels of the rail vehicle. In another example, alternator/generator 140 may be coupled to one or more resistive grids 142. The resistive grids 142 may be configured to dissipate excess engine torque via heat produced by the grids from electricity generated by alternator/generator 140.

In the embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders 105 are coupled to the exhaust passage 116 to route exhaust gas from the engine to atmosphere (after it passes through an exhaust gas treatment system 130 and first and second turbochargers 120 and 124). The donor cylinders 107, which provide engine exhaust gas recirculation (EGR), are coupled exclusively to an EGR passage 162 of an EGR system 160 which routes exhaust gas from the donor cylinders 107 to the intake passage 114 of the engine 104, and not to atmosphere. By introducing cooled exhaust gas to the engine 104, the amount of available oxygen for combustion is decreased, thereby reducing combustion flame temperatures and reducing the formation of nitrogen oxides (e.g., $NO_x$).

Exhaust gas flowing from the donor cylinders 107 to the intake passage 114 passes through a heat exchanger such as an EGR cooler 166 to reduce a temperature of (e.g., cool) the exhaust gas before the exhaust gas returns to the intake passage. The EGR cooler 166 may be an air-to-liquid heat exchanger, for example. In such an example, one or more charge air coolers 132 and 134 disposed in the intake passage 114 (e.g., upstream of where the recirculated exhaust gas enters) may be adjusted to further increase cooling of the charge air such that a mixture temperature of charge air and exhaust gas is maintained at a desired temperature. In other examples, the EGR system 160 may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage 116 rather than the intake passage 114.

Additionally, in some embodiments, the EGR system 160 may include an EGR bypass passage 161 that is configured to divert exhaust from the donor cylinders back to the exhaust passage. The EGR bypass passage 161 may be controlled via an EGR bypass passage valve 163. The valve 163 may be configured with a plurality of restriction points such that a variable amount of exhaust is routed to the exhaust, in order to provide a variable amount of EGR to the intake.

In an alternate embodiment shown in FIG. 1, the donor cylinders 107 may be coupled to an alternate EGR passage 165 (illustrated by the dashed lines) that is configured to selectively route exhaust to the intake or to the exhaust passage. For example, when a second EGR valve 170 is open, exhaust may be routed from the donor cylinders to the EGR cooler 166 and/or additional elements prior to being routed to the intake passage 114. Further, the alternate EGR system includes a first EGR valve 164 disposed between the exhaust passage 116 and the alternate EGR passage 165.

The first EGR valve 164 and second EGR valve 170 may be on/off valves controlled by the control unit 180 (for turning the flow of EGR on or off), or they may control a variable amount of EGR, for example. As such, the valves may be adjusted into a plurality of positions between fully open and fully closed. In some examples, the first EGR valve 164 may be actuated such that an EGR amount is reduced (exhaust gas flows from the EGR passage 165 to the exhaust passage 116). For example, the opening of the first EGR valve 164 may be increased, thereby increasing the flow of exhaust from the donor cylinders to the exhaust passage 116. In other examples, the first EGR valve 164 may be actuated such that the EGR amount is increased (e.g., exhaust gas flows from the exhaust passage 116 to the EGR passage 165). For example, the opening of the first EGR valve 164 may be decreased, thereby reducing flow to the exhaust passage 116. In some embodiments, the alternate EGR system may include a plurality of EGR valves or other flow control elements to control the amount of EGR.

In such a configuration, the first EGR valve 164 is operable to route exhaust from the donor cylinders to the exhaust passage 116 of the engine 104 and the second EGR valve 170 is operable to route exhaust from the donor cylinders to the intake passage 114 of the engine 104. As such, the first EGR valve 164 may be referred to as an EGR bypass valve, while the second EGR valve 170 may be referred to as an EGR metering valve. In the embodiment shown in FIG. 1, the first EGR valve 164 and the second EGR valve 170 may be engine oil, or hydraulically, actuated valves, for example, with a shuttle valve (not shown) to modulate the engine oil. In some examples, the valves may be actuated such that one of the first and second EGR valves 164 and 170 is normally open and the other is normally closed. In other examples, the first and second EGR valves 164 and 170 may be pneumatic valves, electric valves, or another suitable valve.

As shown in FIG. 1, the vehicle system 100 further includes an EGR mixer 172 which mixes the recirculated exhaust gas with charge air such that the exhaust gas may be evenly distributed within the charge air and exhaust gas mixture. In the embodiment depicted in FIG. 1, the EGR system 160 is a high-pressure EGR system which routes exhaust gas from a location upstream of turbochargers 120 and 124 in the exhaust passage 116 to a location downstream of turbochargers 120 and 124 in the intake passage 114. In other embodiments, the vehicle system 100 may additionally or alternatively include a low-pressure EGR system which routes exhaust gas from downstream of the turbochargers 120 and 124 in the exhaust passage 116 to a location upstream of the turbochargers 120 and 124 in the intake passage 114.

As depicted in FIG. 1, the vehicle system 100 further includes a two-stage turbocharger with the first turbocharger 120 and the second turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The first turbocharger 120 operates at a relatively lower pressure, and includes a first turbine 121 which drives a first compressor 122. The first turbine 121 and the first compressor 122 are mechanically coupled via a first shaft 123. The first turbocharger may be referred to the "low-pressure stage" of the turbocharger. The second turbocharger 124 operates at a relatively higher pressure, and includes a second turbine 125 which drives a second compressor 126. The second turbocharger may be referred to the "high-pressure stage" of the turbocharger. The second turbine 125 may be referred to as the high pressure turbine. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, or the like. In one example, three turbochargers are used in series. In another example, only two turbochargers are used in series.

In the embodiment shown in FIG. 1, the second turbocharger 124 is provided with a turbine bypass valve 128 which allows exhaust gas to bypass the second turbocharger 124. The turbine bypass valve 128 may be opened, for example, to divert the exhaust gas flow away from the second turbine 125. In this manner, the rotating speed of the compressor 126, and thus the boost provided by the turbochargers 120, 124 to the engine 104 may be regulated during steady state conditions. Additionally, the first turbocharger 120 may also be provided with a turbine bypass valve. In other embodiments, only the first turbocharger 120 may be provided with a turbine bypass valve, or only the second turbocharger 124 may be provided with a turbine bypass valve. Additionally, the second turbocharger may be provided with a compressor bypass valve 129, which allows gas to bypass the second compressor 126 to avoid compressor surge, for example. In some embodiments, first turbocharger 120 may also be provided with a compressor bypass valve, while in other embodiments, only first turbocharger 120 may be provided with a compressor bypass valve.

According to embodiments disclosed herein, the speed of the second turbine 125 (e.g., high pressure turbine) may be influenced by the position of the turbine bypass valve 128 and one or more valves in the EGR system 160. First turbine 121 (e.g., low pressure turbine) may also be affected by the positions of these valves; however, changes in turbine speed may be less pronounced for the low pressure turbine compared to the high pressure turbine. The turbine bypass valve 128 and EGR valves affect the amount of exhaust gas entering the exhaust passage and traveling through the turbine (or turbines). As such, as the amount of exhaust gas traveling through the high pressure turbine increases, the speed of the high pressure turbine (e.g., turbine speed) increases. Conversely, as the amount of exhaust gas traveling through the high pressure turbine decreases, the speed of the high pressure turbine decreases.

In one embodiment, the high pressure turbine speed changes in response to the actuation of the turbine bypass valve 128, first EGR valve 164, and/or first EGR valve 170. In another embodiment, the high pressure turbine speed changes in response to the actuation of the turbine bypass valve 128 and/or valve 163. For example, when the second EGR valve 170 opens, exhaust gas flow from the donor cylinder exhaust manifold 119 to intake passage 114, downstream of compressor 126, increases. This may decrease the amount of gas traveling to the exhaust passage 116 and through the high pressure turbine. Thus, in response to the second EGR valve 170 opening, or increasing opening, high pressure turbine speed (e.g., turbine speed) may decrease. In another example, when the first EGR valve 164 opens, exhaust gas flow from donor cylinder exhaust manifold 119 to exhaust passage 116 increases. This may increase the amount of gas traveling through the high pressure turbine. Thus, in response to the first EGR valve 164 opening, or increasing opening, turbine speed may increase. In yet another example, when the turbine bypass valve 128 closes, more exhaust gas may flow through the high pressure turbine, thereby increasing turbine speed. Thus, in response to the turbine bypass valve 128 closing, or decreasing opening, turbine speed may increase. Additional examples and details regarding valve positions and changes in turbine speed will be presented below with respect to FIGS. 2-7.

The vehicle system 100 further includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system 100 further includes the control unit 180, which is provided and configured to control various components related to the vehicle system 100. Herein, the control unit 180 may also be referred to as the controller. In one example, the control unit 180 includes a computer control system. The control unit 180 further includes non-transitory, computer readable storage media (not shown) including code for enabling on-board monitoring and control of engine operation. The control unit 180, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system 100. For example, the control unit 180 may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, exhaust temperature, exhaust pressure, turbine speed, or the like. Correspondingly, the control unit 180 may control the vehicle system 100 by sending commands to various components such as traction motors, alternator, cylinder valves, throttle, heat exchangers, wastegates or other valves or flow control elements, or the like.

The system of FIG. 1 may provide for an engine system including an exhaust gas recirculation system, configured to route exhaust gas from a donor cylinder exhaust manifold to an exhaust passage in at least a first mode of operation and to an intake passage in at least a second mode of operation. The engine system may further include a first exhaust gas recirculation valve in the exhaust gas recirculation system, the first exhaust gas recirculation valve being controllable to control flow from the donor cylinder exhaust manifold to the exhaust passage, a second exhaust gas recirculation valve in the exhaust gas recirculation system, the second exhaust gas recirculation valve being controllable to control flow from the donor cylinder exhaust manifold to the intake passage, and a turbine bypass valve for controlling flow of exhaust gas through a high pressure turbine. In one example, the control unit is configured to determine a position of the first exhaust gas recirculation valve based on a high pressure turbine speed response upon commanded actuation of the first exhaust gas recirculation valve while positions of the second exhaust gas recirculation valve and the turbine bypass valve are maintained.

As explained previously, turbine speed may be used to diagnose the correct functioning and position of the one or more EGR valves and turbine bypass valve 128. For example, when one of these valves is commanded actuated by the control unit 180, a turbine speed response upon actuation of the valve may be examined. As described above, the turbine speed response may be a speed response of the high pressure turbine. In an alternate embodiment, the turbine speed response may be a speed response of the low pressure turbine. The commanded actuation of a valve may include a command to increase or decrease the opening size of an aperture defined at least in part by the valve. An expected change in turbine speed, based on the commanded actuation of the valve, may be determined. For example, the opening or closing of one of the EGR valves or the turbine bypass valve 128 may result in a specific turbine speed response. Specifically, upon actuation of one of these valves, the turbine speed may increase or decrease by a specific amount. As such, there may be an expected change in turbine speed for each adjustment of each valve.

In one example, the control unit 180 may contain a look-up table of expected turbine speed responses in response to different valve movements. In one example, the table may contain a turbine speed value or range of values for every valve position combination. In this example, the turbine speed value may also be based on a speed and/or load of the engine. In another example, the table may contain an expected change in turbine speed, such as an increase or decrease in turbine speed, in response to the opening or closing of one of the EGR valves or the turbine bypass valve 128. In yet another example, the table may contain an expected change in turbine speed, including an amount of increase or decrease in turbine speed.

Following a commanded actuation of the valve, the resulting change in turbine speed may be compared to the expected change in turbine speed for that valve movement. Valve degradation or reduced function may be determined from the difference between the change in turbine speed and the expected change in turbine speed. For example, if the difference between the change in turbine speed and the expected change in turbine speed is greater than a threshold difference, the valve may be degraded. In response, a signal or indication may be sent by the controller to a vehicle operator, indicating valve degradation. In another example, when the difference between the change in turbine speed and the expected change in turbine speed is less than the threshold difference, the valve may not be degraded. Thus, no indication of valve degradation may be produced. The threshold difference may be based on the magnitude of the turbine speed response. For example, if an expected change in turbine speed is larger for a valve adjustment, the threshold difference may be larger. However, if the expected change is turbine speed is smaller for a valve adjustment, the threshold difference may be smaller. In another example, the threshold difference may be set such that the difference reflects an amount of valve degradation. For example, the threshold difference may reflect a 30% reduction in valve function. In other example, this value may be higher or lower.

Determining the position of a valve may be based on the turbine speed response upon commanded actuation of the valve and the position of a second valve. In one example, when one of the EGR valves or the turbine bypass valve 128 is commanded actuated, all other EGR valves and/or the turbine bypass valve may be held in a stationary position. In this way, a change in turbine speed following the actuation of one of these valves may be attributed to the adjustment of that valve alone. For example, if the first EGR valve is commanded open and the other valves are held stationary, an increase in turbine speed may indicate proper function of the first EGR valve. However, if the first EGR valve is commanded open and, at the same time, the turbine bypass valve is commanded open, valve function may not be diagnosed. The first valve action may cause the turbine speed to increase while the second valve action may cause the turbine speed to decrease. In one embodiment, the look-up table of expected turbine speed responses may contain responses for two valve adjustments at once. However, it may still be difficult to determine which valve is degraded if the response is different than expected. Thus, the position of a valve that is commanded actuated may be based on the turbine speed response following the commanded actuation and the stationary position of the other EGR valves and/or turbine bypass vale 128.

For example, if the first EGR valve 164 is commanded actuated, degradation of the first EGR valve 164 may be determined based on a high pressure turbine speed response while the second EGR valve 170 and the turbine bypass valve 128 are held stationary.

Further, determining degradation of a first valve may be based on the magnitude of the high pressure turbine response following commanded actuation of the first valve and the position of a second valve. For example, when the first EGR valve 164 is commanded closed while the second EGR valve 170 is maintained open, turbine speed may decrease regardless of whether the turbine bypass valve 128 is opened or closed. However, the amount or magnitude of the decrease in turbine speed may depend on the position of the turbine bypass valve 128. In a first example, the expected change in turbine speed may be a first decrease in turbine speed when the turbine bypass valve 128 is open. In a second example, the expected change in turbine speed may be a larger, second decrease in turbine speed when the turbine bypass valve 128 is closed. The decrease in turbine speed may be larger in the second example since the turbine bypass valve 128 is closed and all the exhaust gas flows through the high pressure turbine. However, in the first example, a portion of the exhaust gas bypasses the turbine through the open turbine bypass valve 128. As such, the magnitude of the decrease in turbine speed may be less in this example since only the portion of the exhaust gas flowing through the high pressure turbine affects the turbine speed. In these examples, the first valve is the first EGR valve 164 and the second valve is the turbine bypass valve 128. In this way, the degradation of the first valve may be determined based on the high pressure turbine speed response following commanded actuation of the first valve and the position of the second valve.

The commanded actuation of one of the EGR valves or the turbine bypass valve 128 may either be in response to an engine operating condition or a diagnostic cycle. For example, a request for increased EGR flow may result in a command to open the second EGR valve 170. During the commanded actuation of the second EGR valve 170, valve function may be diagnosed by monitoring the turbine speed response. In an alternative example, the commanded actuation of one of the above valves may be in response to a diagnostic cycle. For example, a valve may be commanded actuated by the controller in order to determine the position and proper function of the valve. The diagnostic cycle may be programmed to run after a duration of time has passed, or as a maintenance test for the vehicle. For example, if a valve has not been actuated for a set amount of time, a diagnostic cycle may be triggered. As such, the valve may be commanded actuated by the controller and the turbine speed response may be evaluated.

Thus, the vehicle system of FIG. 1 may provide for an engine system comprising a two-staged turbocharger, an EGR system including a first EGR valve, a second EGR valve, a turbine bypass valve, and a control unit. In one example, the control unit may have instructions stored thereon for communicating information relating to a first valve in the engine system based at least in part on a turbine speed response to actuation of the first valve. The information may comprise a position of the first valve that is determined based at least in part on the turbine speed response to actuation of the first valve. The first valve may be one of the first EGR valve, the second EGR valve, and the turbine bypass valve.

Figure 2:
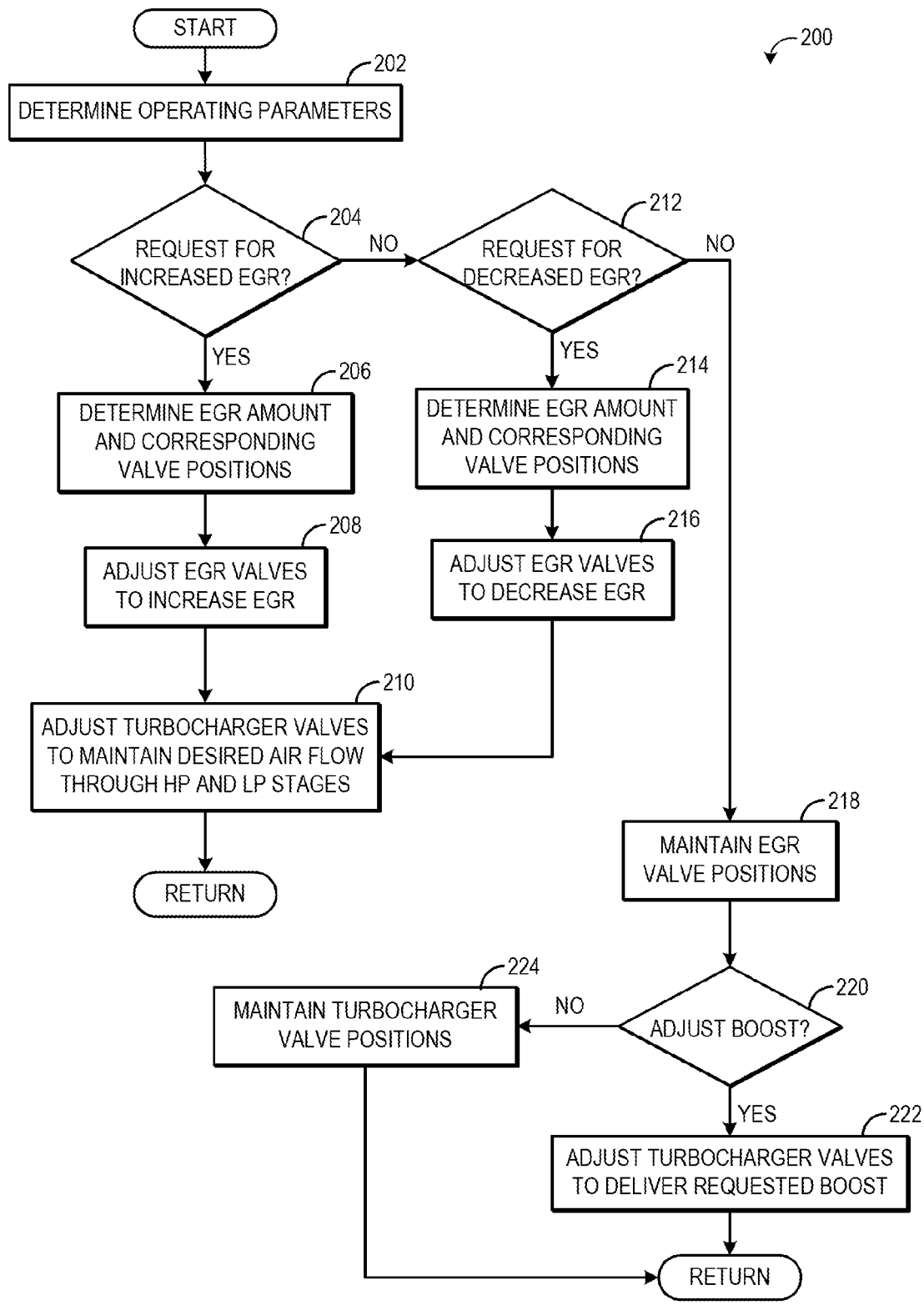
FIG. 2 shows a flow chart illustrating a method for adjusting EGR flow and a flow of exhaust gas through a turbine according to an embodiment of the invention.

One or more EGR valves and a turbine bypass valve may be adjusted in response to an engine operating condition and/or a diagnostic cycle. The commanded actuation of the valve in response to an engine operating condition may include a request to increase or decrease EGR flow and increase or decrease flow through a turbocharger, specifically, a flow of exhaust gas through a turbine. FIG. 2 is a flow chart illustrating a method 200 for adjusting EGR flow and a flow of exhaust gas through a turbine. Method 200 may be carried out by an engine control unit, such as control unit 180, according to instructions stored thereon.

Method 200 begins at 202 by determining engine operating parameters. Engine operating parameters may include engine speed, engine load, oxygen-fuel ratio (OFR), temperature, current EGR flow rate, the position of one or more EGR valves, the position of the turbine bypass valve, and/or other parameters. At 204, the control unit may determine if there is a request for increased EGR flow. If there is a request for increased EGR flow, the method continues on to 206 to determine the demanded EGR flow and the corresponding valve positions. In one example, opening the second EGR valve may increase EGR flow to the intake passage. In another example, if the second EGR valve is already open, closing the first EGR valve may further increase EGR flow. At 208, the selected EGR valves are adjusted to increase the EGR flow by the requested amount. Then, at 210, the turbocharger valves are adjusted to maintain the desired air flow through the high pressure and low pressure turbocharger stages. This may include increasing or decreasing the opening of the turbine bypass valve and/or increasing or decreasing the opening of the compressor bypass valve.

Returning to 204, if there is not a request for increased EGR flow, the method continues on to 212 to determine if there is a request to decrease the EGR flow. If there is a request to decrease the EGR flow, the method determines the demanded EGR flow and the corresponding valve position adjustments at 214. At 216, the control unit may adjust the selected EGR valves to decrease the EGR flow by the requested amount. In one example, this may include opening the first EGR valve. In another example, this may include closing the second EGR valve. After adjusting the EGR valves, the method continues on to 210 to adjust the turbocharger valves to maintain the desired air flow rate through the high pressure and low pressure turbocharger stages.

Returning to 212, if there is not a request to decrease the EGR flow, the method continues on to 218 to maintain the valve positions of the one or more EGR valves. At 220, the method determines if a boost adjustment is needed. If there is a request to adjust the boost level, the turbocharger valves are adjusted to deliver the requested boost at 222. This may include opening the turbine bypass valve to decrease boost or closing the turbine bypass valve to increase boost. However, if no boost adjustment is needed at 220, the method instead maintains the turbocharger valve positions at 224.

Figure 3:
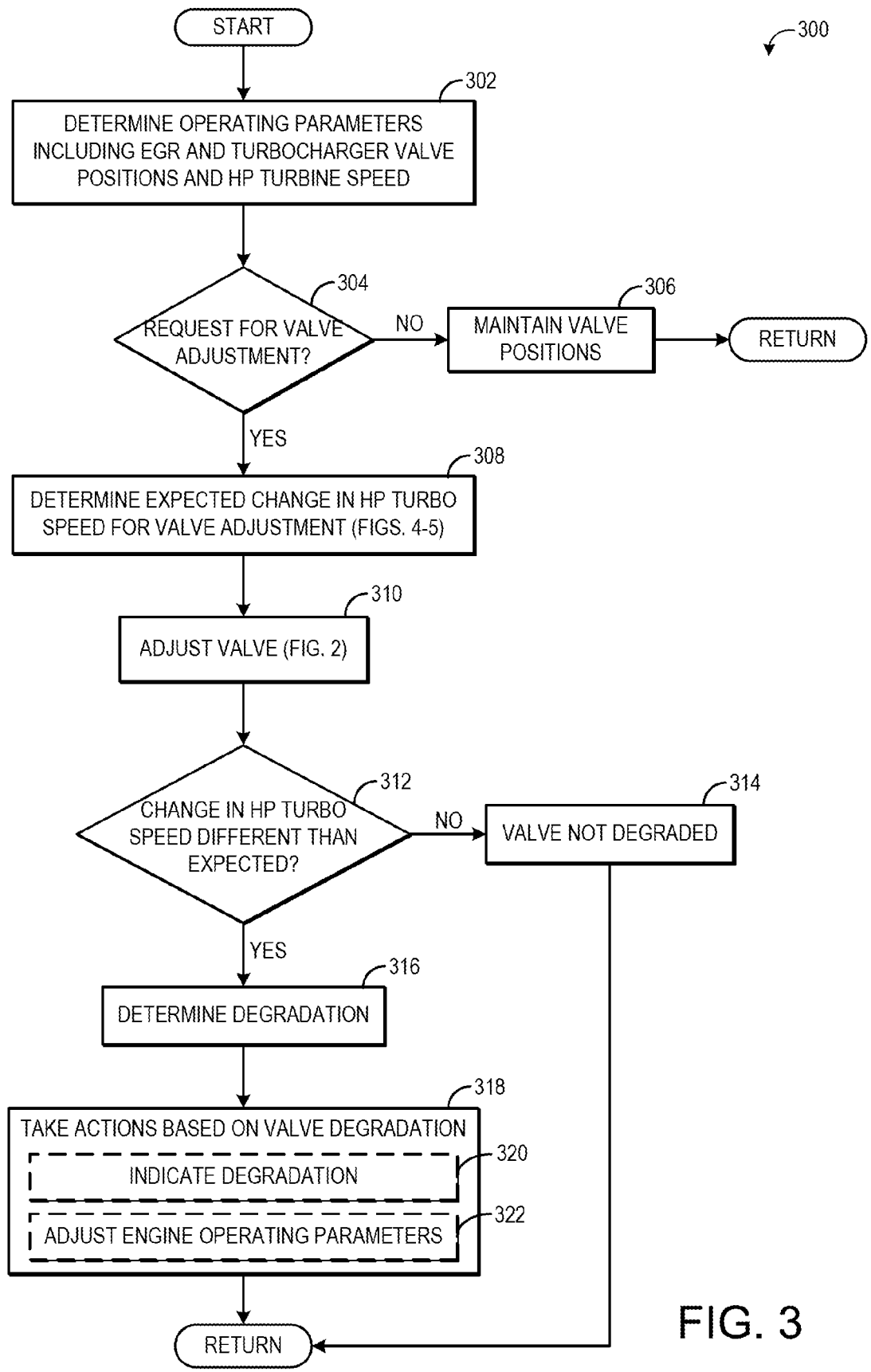
FIG. 3 shows a flow chart illustrating a method for determining a position of a valve according to an embodiment of the invention.

In addition to adjusting the one or more EGR valves and the turbine bypass valve in response to an EGR flow and/or boost request, the selected valve may be adjusted in response to a diagnostic cycle. In either case, a commanded actuation of the valve may result in a turbine speed response. Specifically, the commanded actuation of the valve may result in a change in a high pressure turbine speed, as one example. FIG. 3 is a flow chart illustrating a method 300 for determining a position of a valve in an engine system based on a turbine speed response upon commanded actuation of the valve. The valve may be one of a first EGR valve, a second EGR valve, or a turbine bypass valve.

Method 300 begins at 302 by determining engine operating parameters. Engine operating parameters may include engine speed, engine load, EGR flow rate, the position of one or more EGR valves, the position of the turbine bypass valve, high pressure turbine speed, low pressure turbine speed, and/or other parameters. At 304, the method determines if there is a request for adjustment of one of the EGR valves or the turbine bypass valve. If there is not a request for valve adjustment at 304, the method maintains the EGR valves and turbine bypass valve positions at 306. However, if there is a request to adjust one of these valves, the method continues on to 308.

At 308, the method determines the expected change in high pressure turbine speed (herein, may be referred to as turbine speed) for the valve adjustment, based on the position of a second and/or third valve. For example, if the first valve that is being adjusted is the first EGR valve, the second and third valves may be the second EGR valve and the turbine bypass valve. In another example, if the first valve that is being adjusted is the turbine bypass valve, the second and third valves may be the first EGR valve and the second EGR valve. The expected change in turbine speed for a valve adjustment may be stored in a look-up table in the control unit, as described above. Further details and examples of expected changes in turbine speed for different valve adjustments are shown at FIGS. 4-5, described below.

At 310, the method commands actuation of the selected valve. A method for adjusting the EGR valves and turbine bypass valve is presented above at FIG. 2. The method at 310 may include adjusting the selected valve and holding the other valves (e.g., turbine bypass valve and/or one or more EGR valves) in a stationary position for a duration. The duration may be the duration to measure the actual change in turbine speed. After waiting the duration, further adjustments to the EGR valves and/or turbine bypass valves may be made as outlined in FIG. 2. In some embodiments, the method at 310 may only proceed if certain engine conditions are met. For example, there may be engine speed and engine load conditions in which multiple valves must be adjusted at the same time. This may reduce the accuracy of diagnosis of a degraded valve.

Moving on from 310, at 312 the method determines if the actual change in high pressure turbine speed is different than the expected change in high pressure turbine speed. For example, if the difference between the change in turbine speed and the expected change in turbine speed is less than a threshold difference, the method determines the valve is not degraded at 314. In one example, the difference may be a percent difference and the threshold difference may be percentage such as 10%. For example, if the expected change in turbine speed is less than 10% different than the measured change in turbine speed, the valve may not be degraded. In other examples, this percentage may be larger or smaller than 10%.

If the difference between the change in turbine speed and the expected change in turbine speed at 312 is greater than the threshold difference, the method determines the valve is degraded at 316. If the valve is degraded, the method may take actions based on the valve degradation at 318. In one example, the control unit may send a signal indicating valve degradation at 320. This signal may indicate to the vehicle operator that the valve needs to be checked and possibly repaired. In another example, the control unit may automatically adjust an engine operating parameter based on the valve degradation at 322. For example, if the degraded valve is the first EGR valve, the control unit may adjust the second EGR valve to adjust EGR flow and compensate for the degraded valve. In another example, if the degraded valve is stuck, the control unit may continue actuating the valve and/or adjust another engine parameter to attempt to un-stick the valve. In yet another example, if a valve is determined as being degraded, the control unit is configured to automatically control the vehicle to stop, or to move to a designated location and then stop (e.g., move to a siding, or more to a repair facility), or to operate in a reduced capacity mode of operation (relative to operation before the valve was determined as being degraded), e.g., a "limp home" mode of operation.

In this way, degradation of a first valve in an engine system may be determined based on a high pressure turbine speed response following a commanded actuation of the first valve and a position of a second valve in the engine system. By comparing an expected change in turbine speed to an actual change in turbine speed, valve degradation may be diagnosed. The expected change in turbine speed may be determined from the commanded actuation of the first valve and the position of the second valve.

FIG. 4 is a table 400 listing a high pressure turbine speed response for various conditions wherein one of three valves in an engine system is adjusted while the other two valves are maintained in a stationary position. It should be noted that table 400 displays general behavior of HP turbine speed (e.g., an increase or decrease in turbine speed). Exact amounts of increase and decrease in turbine speed may depend on valve positions, along with engine operating conditions. Further, Table 400 is for a first embodiment of the described invention wherein the engine system contains a first EGR valve, a second EGR valve, and a turbine bypass valve. A table such as table 400 may be used by the control unit to determine an expected high pressure turbine response for a particular valve adjustment.

Table 400 lists seven example conditions in which one of a first EGR valve, a second EGR valve, or a turbine bypass valve is adjusted (e.g., opened or closed) while the other two valve positions are maintained. While this example lists the valve adjustments as opening or closing a valve, in other embodiments the adjustments may include increasing or decreasing the opening of the valve. For each condition, an expected high pressure turbine speed response is listed. When the adjusted valve is either the first EGR valve or the second EGR valve, the position of the turbine bypass valve may not affect the direction of the change in turbine speed (e.g., whether turbine speed increases or decreases). As such, table 400 lists the turbine bypass valve as being either open or closed. However, the magnitude or amount of the increase or decrease in turbine speed may be smaller or larger depending on whether the turbine bypass valve is open or closed. For example, when the turbine bypass valve is closed, all the exhaust gas flows through the turbine and the magnitude of the turbine speed response may be greater than when the turbine bypass valve is open. When the adjusted valve is the turbine bypass valve, the position of the EGR valves may not affect the direction of the change in turbine speed. In one example, the position of the turbine bypass valve may be determined based on a change in turbine speed, independent of positions of the one or more EGR valves. For example, the position of the turbine bypass valve may not be based on a position of one or more other valves in the EGR system. As such, the position of the EGR valves is not listed in table 400 for these conditions.

Condition 1 may be a base, or standard, operating condition of the engine in which the first EGR valve is open, the second EGR valve is closed, and the turbine bypass valve is closed. Condition 2 includes opening the second EGR valve while maintaining the first EGR valve open and the turbine bypass valve either open or closed (or some position between fully open and fully closed). Opening the second EGR valve decreases exhaust flow to the exhaust passage and to the high pressure turbine, thereby decreasing the high pressure turbine speed. Condition 3 includes closing the first EGR valve while maintaining the second EGR valve open and the turbine bypass valve either open or closed. Closing the first EGR valve decreases the flow of exhaust gas to the exhaust passage and through the high pressure turbine, thereby decreasing the speed of the high pressure turbine. Condition 4 includes opening the first EGR valve while maintaining the second EGR valve open and the turbine bypass valve either open or closed. Opening the first EGR valve increases exhaust flow to the high pressure turbine, thereby increasing high pressure turbine speed. Condition 5 includes closing the second EGR valve while maintaining the first EGR valve open and the turbine bypass valve open or closed. Closing the second EGR valve decreases EGR flow and increases exhaust flow to the exhaust passage and high pressure turbine, thereby increasing high pressure turbine speed. In one example, if the turbine bypass valve is open for condition 5, the expected change in turbine speed may be a first increase in turbine speed. In another example, if the turbine bypass valve is closed for condition 5, the expected change in turbine speed may be a larger, second increase in turbine speed.

Returning to table 400, condition 6 includes opening the turbine bypass valve while the EGR valves are maintained in an open or closed position (e.g., current position). Opening the turbine bypass valve decreases exhaust flow through the high pressure turbine, thereby decreasing turbine speed. Finally, condition 7 includes closing the turbine bypass valve while the EGR valves are maintained in an open or closed position. Closing the turbine bypass valve increases the flow of exhaust gas through the high pressure turbine, thereby increasing turbine speed.

Similar to FIG. 4 described above, FIG. 5 is a table 500 listing a high pressure turbine speed response for various conditions wherein one of two valves in an engine system is adjusted while the other valve is maintained in a stationary position. Table 500 is for a second embodiment of the described invention wherein the engine system contains an EGR valve and a turbine bypass valve. A table such as table 500 may be used by the control unit to determine an expected high pressure turbine response for a particular valve adjustment.

Condition 1 may be a base, or standard, operating condition of the engine in which the EGR valve is open and the turbine bypass valve is closed. Condition 2 includes closing the EGR valve while maintaining the turbine bypass valve either open or closed. Closing the EGR valve decreases the flow of exhaust gas to the exhaust passage and through the high pressure turbine; thereby decreasing the speed of the high pressure turbine. Condition 3 includes opening the EGR valve while maintaining the turbine bypass valve either open or closed. Opening the EGR valve increases exhaust flow to the high pressure turbine, thereby increasing high pressure turbine speed. Condition 4 includes opening the turbine bypass valve while the EGR valve is maintained in an open or closed position (e.g., current position). Opening the turbine bypass valve decreases exhaust flow through the high pressure turbine, thereby decreasing turbine speed. Finally, condition 5 includes closing the turbine bypass valve while the EGR valve is maintained in an open or closed position. Closing the turbine bypass valve increases the flow of exhaust gas through the high pressure turbine, thereby increasing turbine speed.

Figure 6:
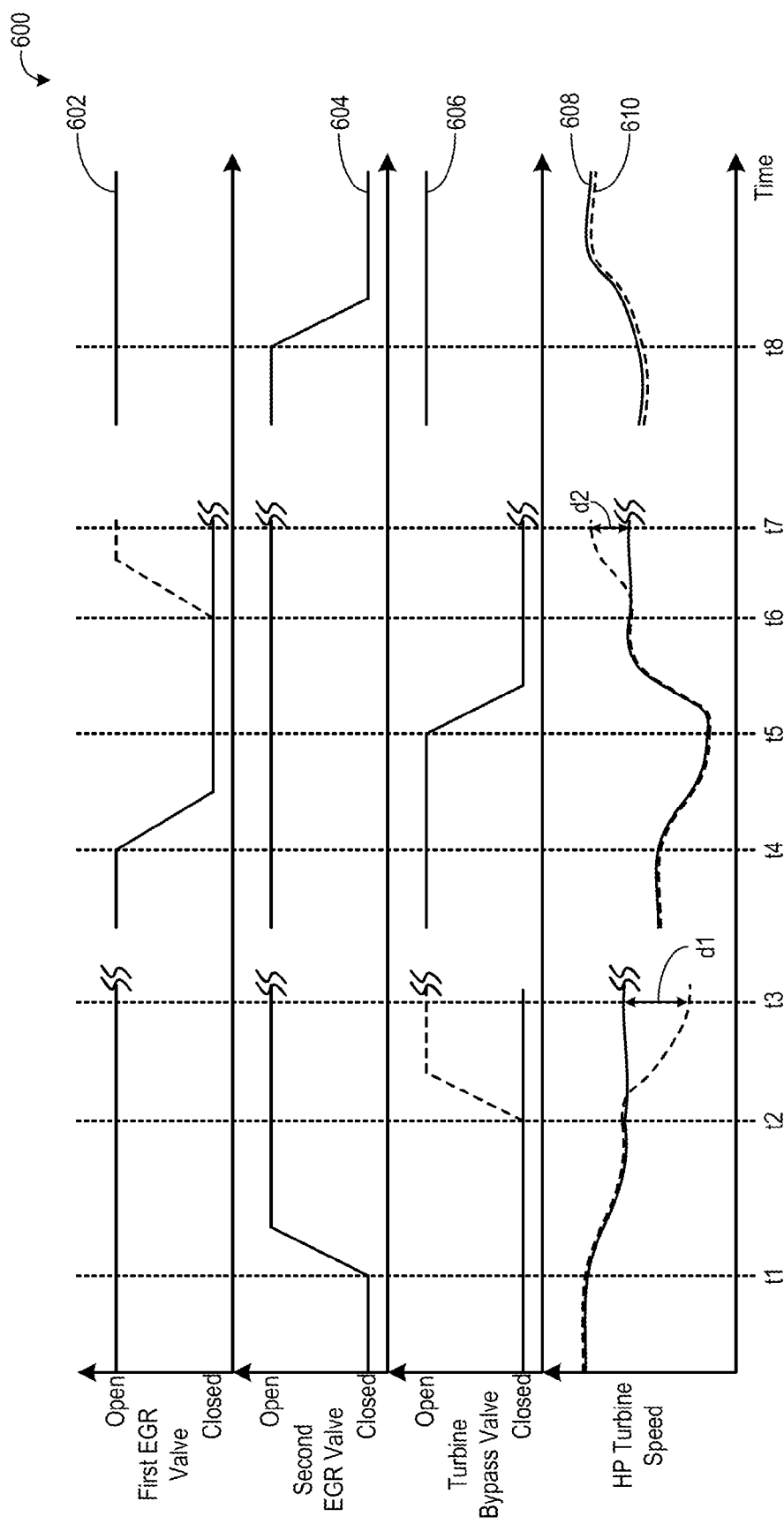
FIG. 6 shows a graph illustrating example responses in high pressure turbine speed according to an embodiment of the invention.
Figure 7:
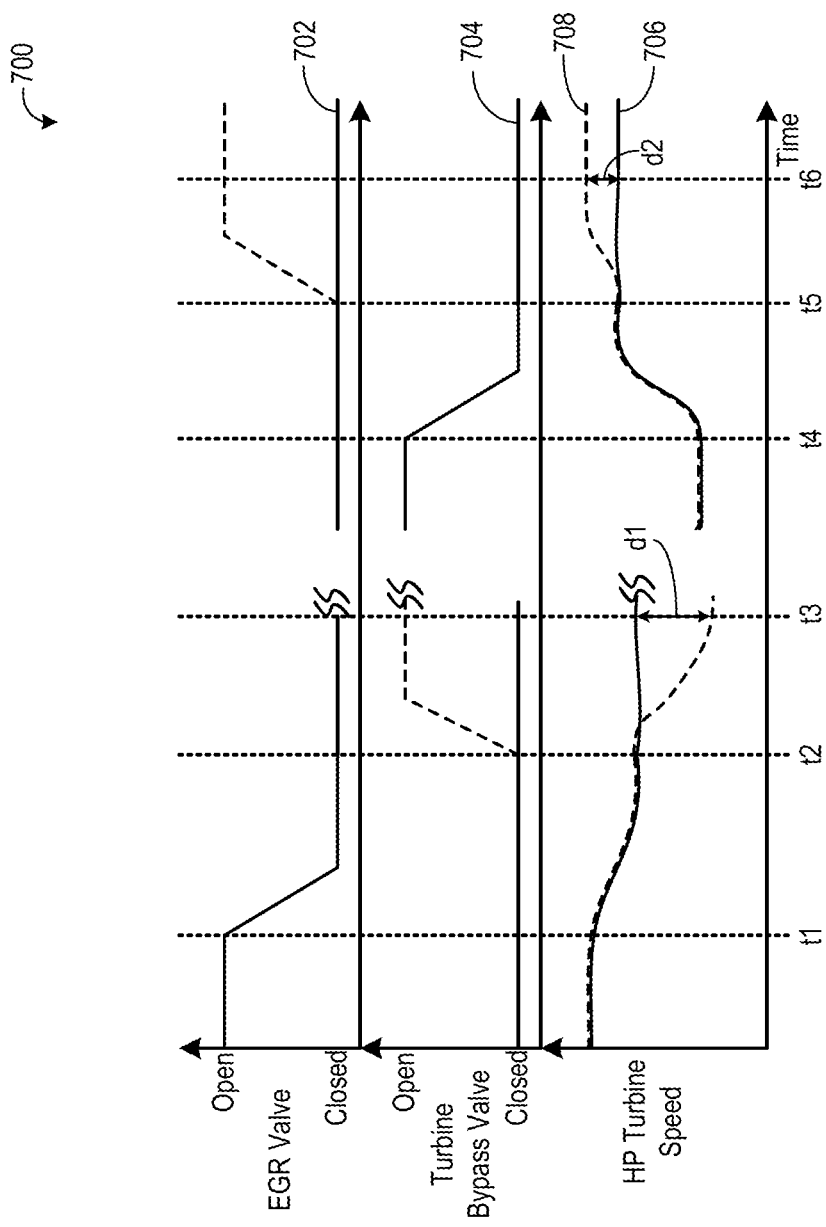
FIG. 7 shows a graph illustrating example responses in high pressure turbine speed according to another embodiment of the invention.

FIG. 6 is a graph 600 showing example responses in high pressure turbine speed for adjustments to a first EGR valve, a second EGR valve, and a turbine bypass valve. Specifically, graph 600 shows changes in position of a first EGR valve at plot 602, changes in position of a second EGR valve at plot 604, changes in position of a turbine bypass valve at plot 606, changes in actual high pressure turbine speed at plot 608, and changes in expected high pressure turbine speed at plot 610.

Prior to time t1, the first EGR valve is open (plot 602), the second EGR valve is closed (plot 604), and the turbine bypass valve is closed (plot 606). Turbine speed is at a relatively high turbine speed (plot 608). At time t1, the controller commands the second EGR valve to open. As the second EGR valve opens, EGR flow to the intake passage increases, thereby decreasing exhaust flow through the high pressure turbine. As a result, turbine speed decreases between time t1 and time t2 (plot 608). The expected change in turbine speed (plot 610) and the actual change in turbine speed (plot 608) between time t1 and time t2, during the opening of the second EGR valve, are relatively similar. The difference between the actual change in turbine speed and the expected change in turbine speed may be less than a threshold difference, thereby indicating proper function of the second EGR valve.

At time t2, the controller receives a signal indicating less exhaust to flow through the high pressure turbine. As a result, the controller actuates the turbine bypass valve to open at time t2 (shown by dotted line at plot 606). The expected turbine speed response decreases (plot 610) upon actuating the turbine bypass valve to open. However, the actual turbine speed does not decrease (plot 608). This may be due to the turbine bypass valve remaining closed at time t2 (plot 606). As a result, the difference between the actual turbine speed and the expected turbine speed, d1, may be greater than a threshold difference at time t3. In response, the controller may indicate degradation of the turbine bypass valve.

After an amount of time has elapsed, the first EGR valve is open (plot 602), the second EGR valve is open (plot 604), and the turbine bypass valve is open (plot 606). At time t4, the controller commands the first EGR valve to close. As the first EGR valve closes, flow to the high pressure turbine decreases, thereby decreasing turbine speed (plot 608). The difference between the change in turbine speed and the expected change in turbine speed may be less than the threshold difference. Thus, the first EGR valve is not degraded.

At time t5, the controller actuates the turbine bypass valve to close. As the turbine bypass valve closes (plot 606), exhaust flow through the high pressure turbine increases, thereby increasing high pressure turbine speed (plot 608). At time t6, the controller commands the first EGR valve to open (shown by dotted line at plot 602). The expected high pressure turbine speed for opening of the first EGR valve may increase. However, the actual turbine speed of the high pressure turbine may not increase at time t6 (plot 608). The difference between the actual turbine speed and the expected turbine speed, d2, at time t7 may be greater than a threshold difference, indicating the first EGR valve is degraded.

After another amount of time has elapsed, the first EGR valve is open (plot 602), the second EGR valve is open (plot 604), and the turbine bypass valve is open (plot 606). At time t8, the controller commands the second EGR valve to close (plot 604). As the second EGR valve closes, exhaust flow to the high pressure turbine increases, thereby increasing turbine speed (plot 608). Since the difference between the turbine speed and the expected turbine speed of the high pressure turbine is less than a threshold difference, the second EGR valve may not be degraded.

In this way, degradation of a valve in an engine system may be indicated based on a turbine speed response upon commanded actuation of the valve. Specifically, degradation of a first valve may be determined by comparing an expected change in turbine speed to an actual change in turbine speed, the expected change in turbine speed determined from the commanded actuation of the first valve and the stationary position of a second and third valve. As such, when the turbine bypass valve is in a stationary position and the second exhaust gas recirculation valve is maintained open, no degradation of the first EGR valve is indicated when the first EGR valve is commanded closed and turbine speed decreases (as shown at time t4) or the first EGR valve is commanded open and turbine speed increases. However, since at time t6 the first EGR valve is commanded open and turbine speed does not increase, the controller may indicate degradation of the first EGR valve.

Further, when the turbine bypass valve is in a stationary position and the first EGR valve is maintained open, no degradation of the second EGR valve is indicated when the second EGR valve is commanded open and turbine speed decreases (as shown at time t1) or the second EGR valve is commanded closed and turbine speed increases (as shown at time t8). Finally, when the first EGR valve is in a stationary position and the second EGR valve is in a stationary position, no degradation of the turbine bypass valve is indicated when the turbine bypass valve is commanded open and turbine speed decreases or the turbine bypass valve is commanded closed and turbine speed increases (as shown at time t5). However, since at time t2 the turbine bypass valve is commanded open and turbine speed does not decrease, the controller may indicate degradation of the turbine bypass valve.

Similar to graph 600 discussed above, FIG. 7 is a graph 700 showing example responses in high pressure turbine speed for adjustments to an EGR valve and a turbine bypass valve. Specifically, graph 700 shows changes in position of an EGR valve at plot 702, changes in position of a turbine bypass valve at plot 704, changes in actual high pressure turbine speed at plot 706, and changes in expected high pressure turbine speed at plot 708.

Prior to time t1, the EGR valve is open (plot 702) and the turbine bypass valve is closed (plot 704). Turbine speed is at a relatively high turbine speed (plot 706). At time t1, the controller commands the EGR valve to close. As the EGR valve closes, EGR flow to the intake passage increases, thereby decreasing exhaust flow through the high pressure turbine. As a result, turbine speed decreases between time t1 and time t2 (plot 706). The expected change in turbine speed (plot 708) and the actual change in turbine speed (plot 706) between time t1 and time t2, during the closing of the EGR valve, are relatively similar. The difference between the actual change in turbine speed and the expected change in turbine speed may be less than a threshold difference, thereby indicating proper function of the EGR valve.

At time t2, the controller receives a signal to decrease exhaust to flow through the high pressure turbine (e.g., decrease boost). As a result, the controller actuates the turbine bypass valve to open at time t2 (shown by dotted line at plot 704). The expected turbine speed response decreases (plot 708) upon actuating the turbine bypass valve to open. However, the actual turbine speed does not decrease (plot 706). This may be due to the turbine bypass valve remaining closed at time t2. As a result, the difference between the actual turbine speed and the expected turbine speed, d1, may be greater than a threshold difference at time t3. In response, the controller may indicate degradation of the turbine bypass valve.

After an amount of time has elapsed, the EGR valve is closed (plot 702) and the turbine bypass valve is open (plot 704). At time t4, the controller commands the turbine bypass valve to close. As the turbine bypass valve closes, flow to the high pressure turbine increases, thereby increasing turbine speed (plot 706). The difference between the change in turbine speed and the expected change in turbine speed may be less than the threshold difference. Thus, the turbine bypass valve is not degraded.

At time t5, the controller commands the EGR valve to open (shown by dotted line at plot 702). The expected high pressure turbine speed for opening the EGR valve may increase. However, the actual turbine speed of the high pressure turbine may not increase at time t5 (plot 706). The difference between the actual turbine speed and the expected turbine speed, d2, at time t6 may be greater than a threshold difference, indicating the EGR valve is degraded.

In this way, degradation of a first valve in an engine system may be determined by comparing an expected change in turbine speed to an actual change in turbine speed, the expected change in turbine speed determined from the commanded actuation of the first valve and the stationary position of a second valve.

As such, the position and function of one or more EGR valves or a turbine bypass valve may be determined. Following a commanded actuation of one of these valves, while the other valves are maintained in a stationary position, a turbine speed response of a high pressure turbine may be examined. By comparing the actual change in turbine speed to an expected change in turbine speed, the position of the commanded valve may be diagnosed. The expected change in turbine speed may be based on the commanded actuation, along with the stationary positions of the other valves. As such, an indication of reduced valve function may be sent to a vehicle operator, allowing valve function to be maintained over time.

As noted, embodiments of the invention relate to a method for controlling an engine system having an engine, a turbocharger operably coupled to the engine (the turbocharger has a compressor and a turbine), and at least a first valve for controlling exhaust flow relative to the turbine. The method comprises communicating information relating to the first valve. The information is determined by a control unit based at least in part on a speed response of the turbine when the first valve is actuated. That is, the first valve is actuated by the control unit (e.g., commanded to actuate for at least partially opening or closing), and the speed response of the turbine, subsequent to the actuation, is processed/analyzed by the control unit for determining the information relating to the first valve. For example, the information may comprise a position of the first valve. In another example, the information may comprise, alternatively or additionally, an indication that the first valve is degraded (that is, is believed to have a reduced level of functionality). The method may further comprise the control unit automatically controlling the engine system based on the information.

In any of the embodiments set forth herein, in the engine system, one or more of the valves of the engine system (e.g., the first EGR valve 164, the second EGR valve 170, the EGR bypass passage valve 163, and/or the turbine bypass valve 128) may lack position sensors associated with the valves. That is, for any of the valves without position sensors associated therewith, valve position is determined without the use of sensors and instead by using one or more of the methods described herein.

An embodiment relates to a system comprising an exhaust gas recirculation system, a first exhaust gas recirculation valve in the exhaust gas recirculation system, a second exhaust gas recirculation valve in the exhaust gas recirculation system, and a control unit. The exhaust gas recirculation system is configured to route exhaust gas from a donor cylinder exhaust manifold to an exhaust passage in at least a first mode of operation and to an intake passage in at least a second mode of operation. The first exhaust gas recirculation valve is controllable to control flow from the donor cylinder exhaust manifold to the exhaust passage. The second exhaust gas recirculation valve is controllable to control flow from the donor cylinder exhaust manifold to the intake passage. The control unit is configured to determine a position of the first exhaust gas recirculation valve based on a turbine speed response (e.g., a high pressure turbine speed response) upon commanded actuation of the first exhaust gas recirculation valve while a position of the second exhaust gas recirculation valve is maintained. In other embodiments, one or both of the first exhaust gas recirculation valve or the second exhaust gas recirculation valve lack a position sensor associated with the valve for sensing a position of the valve.

In another embodiment, a system comprises an exhaust gas recirculation system, a first exhaust gas recirculation valve in the exhaust gas recirculation system, a second exhaust gas recirculation valve in the exhaust gas recirculation system, a turbine bypass valve for controlling flow of exhaust gas through a turbine (e.g., a high pressure turbine), and a control unit. The exhaust gas recirculation system is configured to route exhaust gas from a donor cylinder exhaust manifold to an exhaust passage in at least a first mode of operation and to an intake passage in at least a second mode of operation. The first exhaust gas recirculation valve is controllable to control flow from the donor cylinder exhaust manifold to the exhaust passage. The second exhaust gas recirculation valve is controllable to control flow from the donor cylinder exhaust manifold to the intake passage. The control unit is configured to determine a position of the first exhaust gas recirculation valve based on a turbine speed response (e.g., a high pressure turbine speed response) upon commanded actuation of the first exhaust gas recirculation valve while positions of the second exhaust gas recirculation valve and the turbine bypass valve are maintained. In other embodiments, the first exhaust gas recirculation valve, the second exhaust gas recirculation valve, and/or the turbine bypass valve lack a position sensor associated with the valve for sensing a position of the valve.

In another embodiment, a system comprises an engine, a turbocharger having a compressor and a turbine, an exhaust gas recirculation system comprising a first exhaust gas recirculation valve and a second exhaust gas recirculation valve, and a control unit. The exhaust gas recirculation system is configured to route exhaust gas from a donor cylinder exhaust manifold of the engine to an exhaust passage of the engine in at least a first mode of operation and to an intake passage in at least a second mode of operation. The first exhaust gas recirculation valve is controllable to control flow from the donor cylinder exhaust manifold to the exhaust passage. The second exhaust gas recirculation valve is controllable to control flow from the donor cylinder exhaust manifold to the intake passage. The control unit is configured to determine a position of the first exhaust gas recirculation valve based on a turbine speed response of the turbine upon commanded actuation of the first exhaust gas recirculation valve while a position of the second exhaust gas recirculation valve is maintained. In other embodiments, one or both of the first exhaust gas recirculation valve or the second exhaust gas recirculation valve lack a position sensor associated with the valve for sensing a position of the valve.

In another embodiment, a system comprises an engine, a high-pressure turbocharger having a compressor and a turbine (for example, the system may additionally comprise a low-pressure turbocharger), an exhaust gas recirculation system comprising a first exhaust gas recirculation valve and a second exhaust gas recirculation valve, and a control unit. The exhaust gas recirculation system is configured to route exhaust gas from a donor cylinder exhaust manifold of the engine to an exhaust passage of the engine in at least a first mode of operation and to an intake passage of the engine in at least a second mode of operation. The first exhaust gas recirculation valve is controllable to control flow from the donor cylinder exhaust manifold to the exhaust passage. The second exhaust gas recirculation valve is controllable to control flow from the donor cylinder exhaust manifold to the intake passage. The control unit is configured to determine a position of the first exhaust gas recirculation valve based on a turbine speed response of the high-pressure turbine upon commanded actuation of the first exhaust gas recirculation valve while a position of the second exhaust gas recirculation valve is maintained. In other embodiments, one or both of the first exhaust gas recirculation valve or the second exhaust gas recirculation valve lack a position sensor associated with the valve for sensing a position of the valve.

In another embodiment, a system comprises an engine, a turbocharger having a compressor and a turbine, an exhaust gas recirculation system comprising a first exhaust gas recirculation valve and a second exhaust gas recirculation valve, a turbine bypass valve for controlling flow of exhaust gas through the turbine, and a control unit. The exhaust gas recirculation system is configured to route exhaust gas from a donor cylinder exhaust manifold of the engine to an exhaust passage of the engine in at least a first mode of operation and to an intake passage of the engine in at least a second mode of operation. The first exhaust gas recirculation valve is controllable to control flow from the donor cylinder exhaust manifold to the exhaust passage. The second exhaust gas recirculation valve is controllable to control flow from the donor cylinder exhaust manifold to the intake passage. The control unit is configured to determine a position of the first exhaust gas recirculation valve based on a turbine speed response of the turbine upon commanded actuation of the first exhaust gas recirculation valve while positions of the second exhaust gas recirculation valve and the turbine bypass valve are maintained. In other embodiments, the first exhaust gas recirculation valve, the second exhaust gas recirculation valve, and/or the turbine bypass valve lack a position sensor associated with the valve for sensing a position of the valve.

In another embodiment, a system comprises an engine, a high-pressure turbocharger having a compressor and a turbine (for example, the system may additionally comprise a low-pressure turbocharger), an exhaust gas recirculation system comprising a first exhaust gas recirculation valve and a second exhaust gas recirculation valve, a turbine bypass valve for controlling flow of exhaust gas through the turbine, and a control unit. The exhaust gas recirculation system is configured to route exhaust gas from a donor cylinder exhaust manifold of the engine to an exhaust passage of the engine in at least a first mode of operation and to an intake passage of the engine in at least a second mode of operation. The first exhaust gas recirculation valve is controllable to control flow from the donor cylinder exhaust manifold to the exhaust passage. The second exhaust gas recirculation valve is controllable to control flow from the donor cylinder exhaust manifold to the intake passage. The control unit is configured to determine a position of the first exhaust gas recirculation valve based on a turbine speed response of the high-pressure turbine upon commanded actuation of the first exhaust gas recirculation valve while positions of the second exhaust gas recirculation valve and the turbine bypass valve are maintained. In other embodiments, the first exhaust gas recirculation valve, the second exhaust gas recirculation valve, and/or the turbine bypass valve lack a position sensor associated with the valve for sensing a position of the valve.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," or the like, are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   via a controller of an engine system:
      communicating information relating to a first valve in the engine system based at least in part on a turbine speed response to actuation of the first valve while maintaining a second valve in one of a fully open and fully closed position during actuation of the first valve, where the first valve and the second valve are both positioned in a flow of gas including at least some exhaust gas, wherein the information comprises a position of the first valve that is determined based at least in part on the turbine speed response to actuation of the first valve and the fully open or fully closed position of the second valve and wherein the actuation of the first valve includes a command generated in response to a diagnostic cycle, where the diagnostic cycle is triggered if the first valve has not been actuated for a set amount of time.

2. The method of claim 1, wherein the actuation of the first valve includes a command to increase or decrease an opening size of an aperture defined at least in part by the first valve.

3. The method of claim 1, further comprising determining an expected change in turbine speed based on the actuation of the first valve and the fully open or fully closed position of the second valve.

4. The method of claim 1, wherein the first valve is a first exhaust gas recirculation valve disposed in an exhaust gas recirculation system of the engine system and the second valve is a second exhaust gas recirculation valve disposed in the exhaust gas recirculation system.

5. The method of claim 4, further comprising maintaining a turbine bypass valve disposed in a bypass around a turbine, the turbine disposed in an exhaust passage, in one of a fully open and fully closed position during actuation of the first valve and wherein the position of the first valve is determined based at least in part on the turbine speed response to actuation of the first valve and the fully open or fully closed position of the second valve and the turbine bypass valve.

6. The method of claim 1, wherein the first valve is a turbine bypass valve and wherein the position of the turbine bypass valve is determined based on the turbine speed response comprising a change in turbine speed and not based on a position of one or more other valves in an exhaust gas recirculation system.

7. The method of claim 1, wherein communicating the information comprises indicating degradation of the first valve based on the turbine speed response upon the actuation of the first valve being commanded.

8. The method of claim 7, wherein indicating degradation of the first valve includes comparing a change in turbine speed to an expected change in turbine speed, where the expected change in turbine speed is determined from the commanded actuation of the first valve and the fully open or fully closed position of the second valve.

9. The method of claim 8, further comprising indicating degradation of the first valve when a difference between the change in turbine speed and the expected change in turbine speed is greater than a threshold difference that is indicative of the first valve being degraded.

10. A method, comprising:
    via a controller of an engine system:
       communicating information relating to a first valve in the engine system based at least in part on a turbine speed response to actuation of the first valve while maintaining a second valve in one of a fully open and fully closed position during actuation of the first valve, where the first valve and the second valve are both positioned in a flow of gas including at least some exhaust gas, wherein communicating the information comprises indicating degradation of the first valve based on the turbine speed response upon the actuation of the first valve being commanded, and wherein indicating degradation of the first valve includes comparing a change in turbine speed to an expected change in turbine speed, where the expected change in turbine speed is determined from the commanded actuation of the first valve and the fully open or fully closed position of the second valve;
       indicating degradation of the first valve when a difference between the change in turbine speed and the expected change in turbine speed is greater than a threshold difference that is indicative of the first valve being degraded; and
       adjusting engine operation based on the difference between the change in turbine speed and the expected change in turbine speed being greater than the threshold difference.

11. The method of claim 10, wherein the actuation of the first valve includes a command generated in response to an engine operating condition.

12. The method of claim 10, further comprising when the difference between the change in turbine speed and the expected change in turbine speed is less than the threshold difference, not indicating valve degradation.

13. The method of claim 10, wherein the threshold difference reflects an amount of valve degradation.

14. The method of claim 10, wherein the threshold difference is based on a magnitude of the turbine speed response, where the threshold difference increases as the expected change in turbine speed increases.

15. An engine system, comprising:
    an exhaust gas recirculation system configured to route exhaust gas from a donor cylinder exhaust manifold to an exhaust passage in at least a first mode of operation and to an intake passage in at least a second mode of operation;

a first exhaust gas recirculation valve in the exhaust gas recirculation system, the first exhaust gas recirculation valve being controllable to control flow from the donor cylinder exhaust manifold to the exhaust passage and where the first exhaust gas recirculation valve lacks a position sensor associated with the valve for sensing a position of the first exhaust gas recirculation valve;

a second exhaust gas recirculation valve in the exhaust gas recirculation system, the second exhaust gas recirculation valve being controllable to control flow from the donor cylinder exhaust manifold to the intake passage;

a turbine bypass valve for controlling flow of exhaust gas through a high pressure turbine; and a control unit configured to:
- determine the position of the first exhaust gas recirculation valve based on a high pressure turbine speed response upon commanded actuation of the first exhaust gas recirculation valve while positions of the second exhaust gas recirculation valve and the turbine bypass valve are maintained in one of a fully open and fully closed position;
- indicate degradation of the first exhaust gas recirculation valve when a difference between an actual change in turbine speed and an expected change in turbine speed is greater than a threshold difference; and
- adjust operation of the engine system based on the indicated degradation of the first exhaust gas recirculation valve, where adjusting operation includes adjusting the second exhaust gas recirculation valve to adjust exhaust gas recirculation flow.

16. A method comprising:
via a controller of an engine:
- determining a position of a first valve in an exhaust gas recirculation system of the engine based on a turbine speed response upon commanded actuation of the first valve while maintaining a second valve in the exhaust gas recirculation system and a turbine bypass valve in one of a fully open and fully closed position; and
- indicating degradation of the first valve when a difference between an actual change in turbine speed and an expected change in turbine speed is greater than a threshold difference and further comprising adjusting engine operation based on the indicated degradation of the first valve, where adjusting engine operation includes adjusting the second valve to adjust exhaust gas recirculation flow.

17. The method of claim 16, wherein when the first valve is commanded closed while the second valve is maintained fully open:
- the expected change in turbine speed is a first decrease in turbine speed when the turbine bypass valve is fully open, and
- the expected change in turbine speed is a larger, second decrease in turbine speed when the turbine bypass valve is fully closed.

18. The method of claim 16, wherein when the second valve is commanded closed while the first valve is maintained fully open:
- the expected change in turbine speed is a first increase in turbine speed when the turbine bypass valve is fully open, and
- the expected change in turbine speed is a larger, second increase in turbine speed when the turbine bypass valve is fully closed.

* * * * *